United States Patent [19]

Horn

[11] Patent Number: 4,952,861
[45] Date of Patent: Aug. 28, 1990

[54] PROCESS FOR CHARGING MAINTENANCE-FREE LEAD BATTERIES WITH A FIXED ELECTROLYTE

[75] Inventor: Karl G. Horn, Kelkheim, Fed. Rep. of Germany

[73] Assignee: Varta Batterie Aktiengesellschaft, Hanover, Fed. Rep. of Germany

[21] Appl. No.: 240,922

[22] Filed: Sep. 6, 1988

[30] Foreign Application Priority Data

Sep. 25, 1987 [DE] Fed. Rep. of Germany ....... 3732339

[51] Int. Cl.$^5$ .................... H02J 7/00; H01M 10/44
[52] U.S. Cl. ........................................ 320/23; 320/32; 320/39
[58] Field of Search ................. 320/22–24, 320/32, 39

[56] References Cited

U.S. PATENT DOCUMENTS

| | | | |
|---|---|---|---|
| 3,854,082 | 12/1974 | Nasby et al. | 320/39 X |
| 3,864,617 | 2/1975 | Smith et al. | 320/23 |
| 4,061,956 | 12/1977 | Brown et al. | 320/23 X |
| 4,125,802 | 11/1978 | Godard | 320/22 X |
| 4,270,080 | 5/1981 | Kostecki | 320/32 X |
| 4,609,861 | 9/1986 | Inaniwa et al. | 320/32 |

Primary Examiner—R. J. Hickey
Attorney, Agent, or Firm—Weiser & Stapler

[57] ABSTRACT

A three-stage rapid charging process for maintenance-free lead storage batteries with a fixed electrolyte, which produces consistently recurring full charging of both electrode polarities even under cyclic loading, includes a first charging stage which proceeds at a constant current of the magnitude of a four-hour to eight-hour current until a temperature-dependent charging voltage is reached, a second charging stage which then continues at this temperature-dependent charging voltage for a limited time, and which is continuously adjusted to the battery's temperature, and a third charging stage which is again time-limited and which constitutes a secondary charging which proceeds according to an I/V characteristic curve with an initial charging current limited to between 0.05 and 0.5 times a ten-hour current and a battery voltage which is limited to between 2% and 8% above the temperature-dependent charging voltage.

27 Claims, 2 Drawing Sheets

PROCESS FOR CHARGING MAINTENANCE-FREE LEAD BATTERIES WITH A FIXED ELECTROLYTE

BACKGROUND OF THE INVENTION

The present invention generally pertains to a process for the rapid charging of maintenance-free lead batteries with a fixed electrolyte.

The standards of manufacture which have been achieved in producing maintenance-free lead batteries (which allow for practically gas-tight, and in particular, position-independent operation) have renewed interest in many special applications and uses for the lead storage battery. Another factor contributing to increased ease of operation is the ability to charge a maintenance-free battery with relatively high currents, so that it becomes fully available for use within only a few hours. However, conventional charging processes do not adequately account for the special circumstances of cells with fixed electrolytes.

For the rapid charging of lead storage cells with a liquid electrolyte, the known two-stage charging process (according to an I/V characteristic curve) is generally sufficient. In a first stage of this process, charging proceeds with a high constant current (I) until gassing begins, at a given voltage (V). In a second stage of this process, continued charging proceeds at a constant cell voltage of about 2.4 volts, until the current developed by this constant charging voltage decreases to about 1/20th of the five-hour discharge current. Advantages of this charging method, for cells with a liquid electrolyte, are that the initial charge state is immaterial and that a fully charged cell is obtained in all cases.

At the transition from the first to the second charging stage, the charging reaction at the positive electrode $$PbSO_{a4} + 2H_2O \rightarrow PbO_2 + H_2SO_4 + 2H^+ + 2e^- \quad (1)$$

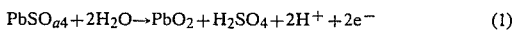

is increasingly accompanied by the secondary reaction $$H_2O \rightarrow 1/2 O_2 + 2H^+ + 2e^- \quad (2)$$

and the charging reaction at the negative electrode $$PbSO_4 + 2H^+ + 2e^- \rightarrow Pb + H_2SO_4 \quad (3)$$

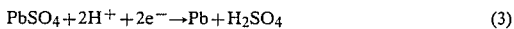

is increasingly accompanied by the secondary reaction $$2H^+ + 2e^- \rightarrow H_2 \quad (4)$$

Both secondary reactions, which represent the decomposition of water, are associated with a voltage swing which progresses in the positive direction at the positive electrode, and in the negative direction at the negative electrode. As a result, the cell voltage, which is held constant during the second charging stage, is reached. Since these voltage swings indicate that the actual charging reactions (1) and (3) are being replaced by the parasitic secondary reactions (2) and (4), such voltage swings are therefore suitable as control variables for switching from constant-current charging to constant-voltage charging in a two-stage process for cells with a liquid electrolyte.

However, in the case of maintenance-free batteries with a fixed electrolyte, the reduction of oxygen essentially occurs as a parasitic secondary reaction at the negative electrode. The distinct voltage decrease which is seen at the negative pole of an open cell is absent. The previously described two-stage charging process has therefore not always been satisfactory in connection with such cells. Moreover, experience has shown that cell capacity tends to drop during cycled operation, and that the resulting deficit cannot be compensated for without creating an additional loss of water (and thus electrolyte).

Consequently, the manufacturers of maintenance-free batteries, in their brochures, often indicate modified charging methods which, as a rule, are effective only for a certain series of storage batteries. This is because there are often very substantial differences in design between such series, including the way in which the electrolyte is fixed, namely, by gelling or by means of highly absorbent mats.

One such modified charging method replaces conventional I/V charging with a three-stage $I_1/V/I_2$ charging method. The special feature of this charging method is that during the voltage-controlled charging phase, which is short, the charging process does not wait until the self-regulating charging current decays. Rather, when the charging current has decreased to a defined value $I_2$ (a certain percentage of the five-hour charging current), charging continues at this constant current ($I_2$) until the end of the anticipated total charging time. If, for example, $I_2 = 80\%$ of the five-hour current, and assuming the cell was previously completely discharged, the total charging time is generally between 13 and 15 hours.

Two other charging processes are known, one which operates with a constant charging current throughout the entire process, and another which operates with a constant charging voltage throughout the entire process. The constant charging voltage process is economical, and is widely used for gas-tight alkaline batteries. However, in a sealed lead storage battery, unregulated charging can result in elevated water loss. For constant charging currents, the supply voltage must be adjusted to the characteristic charging and temperature behavior of the battery. Otherwise, overcharging (with a possible increase in water consumption) or insufficient charging would result.

These and other charging methods for gas-tight lead cells are also not always equally favorable for different applications, such as when cyclically loaded or when placed on standby while maintaining a charge.

SUMMARY OF THE INVENTION

It is therefore the primary object of the present invention to provide a process for a reliable and full rapid charging of sealed lead batteries.

It is also an object of the present invention to provide a process for a reliable and full rapid charging of sealed lead batteries which does not require the use of special equipment.

It is also an object of the present invention to provide a process for a reliable and full rapid charging of sealed lead batteries which minimizes water consumption, thereby ensuring a longer useful life.

These and other objects are achieved in accordance with the present invention by providing a process for the rapid charging of maintenance-free lead batteries with a fixed electrolyte in which charging proceeds in three successive stages. In a first stage, charging proceeds at a constant, four-hour to eight-hour current ($I_1$) until a temperature-dependent charging voltage $V_1(T)$ is reached. In a second stage, charging continues at the charging voltage $V_1(T)$ which had been reached in the first stage, but which is now continuously adjusted (voltage controlled) to the battery temperature. Such charging proceeds for a predefined time which, together with the time for the first stage, amounts to four to ten hours, and preferably five to eight hours. In a third stage, secondary charging proceeds, again in a time-limited manner, according to an I/V characteristic curve with an initial current ($I_2$ max) limited to values between 0.05 and 0.5 times a ten-hour current and a maximum battery voltage ($V_2$ max) limited to a value which is between 2% and 8%, and preferably about 5% higher than the charging voltage $V_1(T)$.

For further detail regarding the process of this invention, reference is made to the description which is provided below, together with the following illustrations.

DETAILED DESCRIPTION OF THE PREFERRED EMBODIMENT

Figure 1:
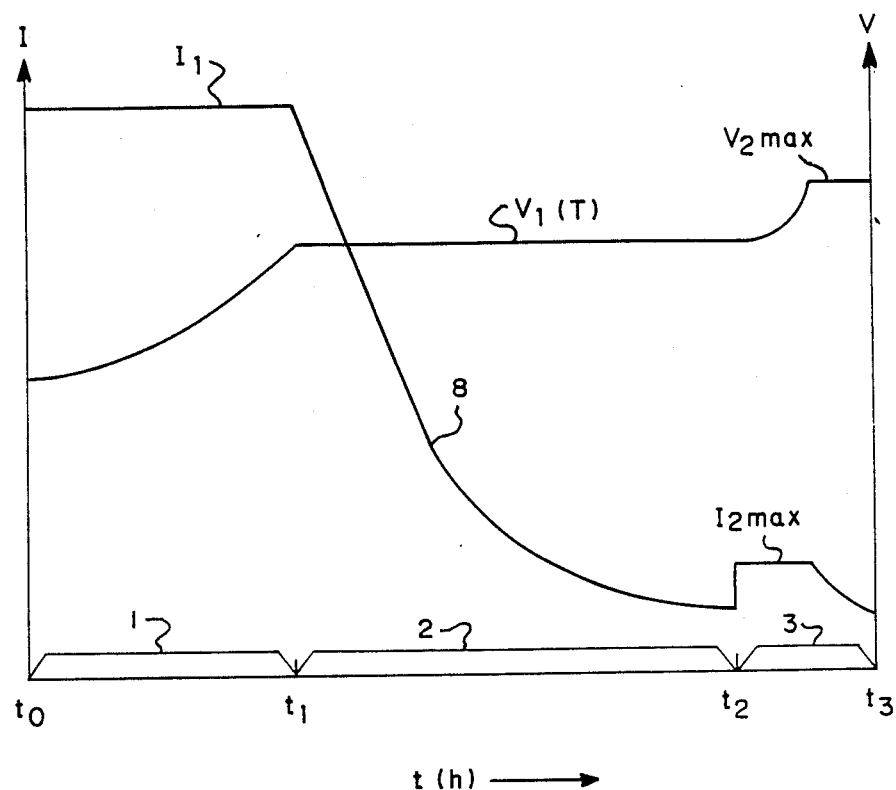
FIG. 1 is a graph showing curves for charging voltage and charging current in the three time periods of the process of the present invention.

In accordance with the present invention, and with reference to FIG. 1, charging generally proceeds in three stages. In a first stage 1, charging is similar to that of a known I/V characteristic curve with a constant charging current ($I_1$) of a magnitude of a four-hour to eight-hour discharge current, which can be usefully accepted (absorbed) and stored until a predefined temperature-dependent charging voltage ($V_1(T)$ of about 2.45 volts at 25° C.) is reached. Thus, this first charging stage ends at a time $t_1$. Charging then continues at this voltage level $V_1(T)$ until a time $t_2$. However, in accordance with the present invention, during this second charging stage 2 the charging voltage is continuously adjusted to the battery temperature.

Figure 2:
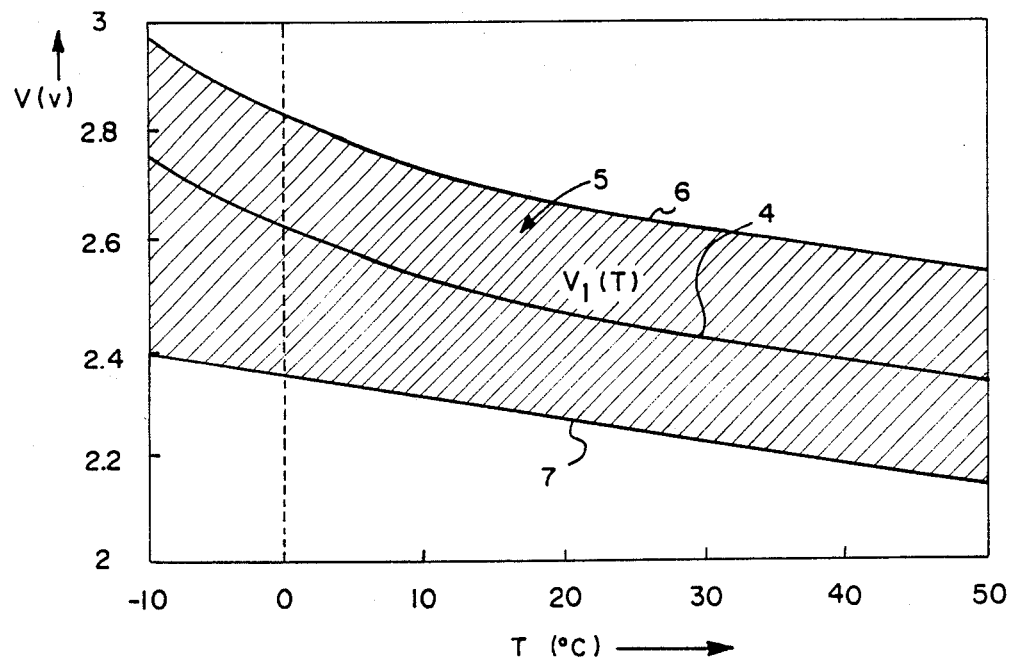
FIG. 2 is a graph showing a V/T characteristic curve which serves as the basis for controlling the temperature-dependent charging voltage phase.

The voltage temperature coefficient of a battery will be indicated by the battery manufacturer, but is generally about −4 mV/degree at temperatures above 25° C. The equation governing the temperature-dependent charging voltage $V_1(T)$ in the second charging stage, for $T \geq 25°$ C., is therefore $$V_1(T) = 2.45 - 0.0004 \times (T-25) \text{ volts},$$

where T=battery temperature in ° C. The voltage/temperature characteristic curve of FIG. 2 shows that this temperature coefficient becomes larger at lower temperatures, because of poorer current acceptance by the lead cell.

Voltage-controlled charging during the time period $t_1 - t_2$ therefore assumes a continuous measurement of battery temperature at a suitable point. It is best to measure this temperature either inside a representative cell, between two cells of the battery, or at the terminal connector between two cells. The resulting measured values must then be correlated with the charging voltage $V_1(T)$, which is then controlled by a suitable charging device (itself of known construction) on the basis of battery temperature with reference to an empirical voltage/temperature characteristic curve. This characteristic curve is initially determined from experimentally measured cell voltage/temperature value pairs, and is then appropriately entered into the known charging device.

Because of the interdependence of voltage and current, the resulting $V_1(T)$ characteristic curve 4 is applicable (within a certain band of predetermined charging currents) only for a selected current (e.g., the five-hour current). The charging device therefore preferably uses as its basis for control a fairly broad characteristic field 5, as illustrated in FIG. 2. In this characteristic field, the upper 6 and lower 7 curves represent the limitation on charging voltage resulting from current level.

As a consequence of the battery's decreasing ability to accept charge, the now self-regulating charging current decays in the second charging phase along a declining region 8 (FIG. 1), with its magnitude still subject to certain fluctuations resulting from regulated changes in the control voltage $V_1(T)$ (not shown in the figure).

The second charging stage is limited in duration, and ends at a time $t_2$. This duration is defined so that the total charging time of the first and second stages $t_0 - t_2$ is between four and ten hours, and preferably between five and eight hours. Approximately three hours of this time period are generally allotted to the first charging stage.

A third charging stage 3 then occurs according to the present invention, which extends over the time interval $t_2 - t_3$ and which is also time-limited. During this interval, secondary charging occurs so that both electrodes are fully charged. This secondary charging proceeds, as in the first two charging stages, in accordance with an I/V characteristic curve (with a temperature-controlled voltage) in which the current and voltage are each limited to maximum values $I_2$ max and $V_2$ max, respectively, as defined by the charging device which is used. Under such conditions, the current/voltage curve during secondary charging can take one of three different shapes. The manner in which this secondary charging will proceed ultimately depends upon the charge state of the battery at the time $t_2$.

FIG. 1 illustrates the general case in which, at the time $t_2$, the charging device supplies a charging voltage $V_2$ max of between 50 and 200 mV (preferably about 120 mV) above $V_1(T)$, with the difference ($\Delta V$) corresponding to approximately 2% to 8% (preferably about 5%) of a charging voltage of 2.45 volts. According to the present invention, $V_2$ max is also temperaturecontrolled, so that in the preferred case, the following approximately applies $$V_2 \text{ max} = V_1(T) + \Delta V = 2.57 - 0.004 \ (T-25) \text{ volts}.$$

In addition to $V_2$ max, the charging current $I_2$ max is also defined. Its magnitude is set in the region $$0.05 \times I_{10} \leq I_2 \text{ max} \leq 0.5 \times I_{10}$$

(the identified reference magnitude is the ten-hour discharge current), although it should not be less than $0.05 \times I_{10}$ so that it is not entirely given over to oxygen consumption, but rather produces a true secondary charging effect. Advantageously, $I_2$ max is between $0.1 \times I_{10}$ and $0.3 \times I_{10}$.

If the charge state of the battery at the time $t_2$ is then such that it is still accepting a charging current of the magnitude $I_2$ max, and a higher battery voltage is only gradually being achieved with this charging current, constant current charging at $I_2$ max will occur until the battery voltage has reached the level $V_2$ max. Thereafter, charging occurs on a voltage-limited basis at $V_2$ max and with a decreasing current, until charging ends at the time $t_3$. In the process, a current/voltage curve corresponding to an I/V characteristic curve is followed.

In addition to the "standard case" which is illustrated in FIG. 1, the following variants can occur. One variant results when the battery is still capable of accepting charge at the charging current $I_2$ max throughout the entire time interval $t_2-t_3$, but this current does not force the battery voltage up to $V_2$max. In this case, charging occurs at $I_2$ max throughout the third charging stage. In another variant, the battery voltage temporarily reaches the limit $V_2$ max defined by the charging device. Since a charging current $I_2$ max can no longer be accepted after the time $t_2$, charging then proceeds at this limited voltage, with the current decreasing over the entire time interval $t_2-t_3$, until its end.

The duration of the secondary charging period can be between 0.5 and 4 hours, and preferably takes between 0.5 and 1.5 hours. For example, if a constant current $I_1$ equalling $1.25 \times I_5$ is selected for the first charging stage (the $V_1(T)$ characteristic curve in FIG. 2 is precisely applicable to this charging current), a battery can then be charged with this charging current in about 7-½ hours, with the first and second stages accounting for 6-½ hours, and secondary charging taking one hour.

Accordingly, the charging process of the present invention, as previously described, follows the pattern of two successive temperature-regulated I/V charges, the second of which (secondary charging as the third stage) has particular significance to the present invention. With this process, both electrodes are fully charged, even in a relatively brief time span. Similarly, the inevitable losses of water are minimized.

In contrast, the reason why a pure I/V charging process as initially described cannot be used with similar success in maintenance-free batteries will now be briefly explained. In batteries with a fixed electrolyte, instead of the secondary reaction (4) previously identified, what predominantly takes place is the oxygen consumption reaction

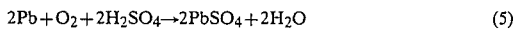

$$2Pb + O_2 + 2H_2SO_4 \rightarrow 2PbSO_4 + 2H_2O \qquad (5)$$

although for thermodynamic reasons reaction (4) cannot be completely suppressed and a small loss of water will therefore result. Because of the consumption reaction (5), the negative electrode is more or less discharged, but at the same time the $PbSO_4$ that has formed is reduced back to Pb by the charging current (i.e., according to reaction equation (3) previously identified). The negative electrode therefore does not reach the gassing potential, but instead remains at the $Pb/Pb^{2+}$ potential, and therefore contributes no inherent voltage swing which can, together with the voltage swing of the positive electrode, serve as a control variable for an I/V charging process. All that remains as a control variable is therefore the positive voltage swing, leaving aside the fact that as the age of the cell increases, the negative electrode capacity is generally exhausted more quickly (i.e., the negative electrode becomes the limiting electrode). Because of the different charging efficiencies of the two electrodes, in a cycled operation this kind of charging process leads to a divergence in the charge states of the positive and negative electrodes, and accordingly an incomplete cell charging (capacity decrease) or a substantial overcharging, and to a large loss of water (electrolyte).

This also demonstrates that in the process of the present invention, water loss can be minimized because the upper charging voltage limit is adjusted to battery temperature, since maintaining a high battery voltage at high temperature has the opposite and undesirable effect. The features of the present invention have a particularly advantageous effect, especially at higher initial currents (rapid charging) in the first charging stage, since the battery then heats up considerably, and its charging characteristics are likely to shift. Voltage correction according to the $V_1(T)$ characteristic curve in the second charging stage is then even more effective.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for rapid charging of a maintenance-free lead battery with a fixed electrolyte, comprising the steps of:

charging said battery during a first charging state with a constant current until a temperature-dependent voltage is reached;

charging said battery during a second charging stage at said temperature-dependent voltage reached during said first charging stage for a defined time period, and in voltage-controlled manner, wherein said charging voltage is continuously adjusted to the temperature of said battery; and charging said battery during a third charging stage for a defined time period, wherein said charging during said third charging stage is a secondary charging according to an I/V characteristic curve which proceeds at a limited current until a maximum voltage is reached, and which then proceeds at said maximum voltage, wherein said maximum voltage is higher than said temperature-dependent voltage of the second charging stage.

2. The process of claim 1 wherein said rapid charging consists essentially of said first, second and third charging steps.

3. The process of claim 1, wherein said constant current of the first charging stage is between a four-hour current and an eight-hour current.

4. The process of claim 1, wherein said first charging stage and said second charging stage continue for a combined time period of between four and ten hours.

5. The process of claim 4 wherein said combined time period is between 5 and 8 hours.

6. The process of claim 4 wherein said first charging stage continues for about 3 hours.

7. The process of claim 4 wherein said defined time period of the third charging stage is between 0.5 and 4.0 hours.

8. The process of claim 7 wherein said period is between 0.5 and 1.5 hours.

9. The process of claim 1 wherein said limited current is initially limited to between 0.05 and 0.5 times a ten-hour current.

10. The process of claim 9 wherein said limited current is between 0.1 and 0.3 times said ten-hour current.

11. The process of claim 1 wherein said maximum voltage is 2% to 8% above said temperature-dependent charging voltage.

12. The process of claim 11 wherein said maximum voltage is about 5% above said temperature-dependent charging voltage.

13. The process of claim 1 wherein said temperature-dependent charging voltage of the second charging stage and the third charging stage is continuously controlled according to a voltage/temperature characteristic curve which is contained within a characteristic field of a defined voltage width and controlled by said charging current.

14. The process of claim 1 wherein said battery temperature is measured inside a cell of said battery.

15. The process of claim 1 wherein said battery temperature is measured between two cells of said battery.

16. The process of claim 1 wherein said battery temperature is measured on a terminal connector of said battery, between two cells of the battery.

17. A process for rapid charging of a maintenance-free lead battery with a fixed electrolyte, in three successive stages comprising:
    charging said battery during a first charging stage with a constant current between a four-hour current and an eight-hour current until a temperature-dependent charging voltage is reached;
    charging said battery during a second charging state at said temperature-dependent voltage reached during said first charging stage and in voltage-controlled manner, wherein said first charging stage and said second charging stage continue for a combined time period of between four and ten hours, and wherein said charging voltage is continuously adjusted to the temperature of said battery; and
    charging said battery during a third charging stage for a defined time period, wherein said charging during said third charging stage is a secondary charging according to an I/V characteristic curve which initially proceeds at a current limited to between 0.05 and 0.5 times a ten-hour current until a maximum voltage is reached, and which then proceeds at said maximum voltage, which is limited to between 2% and 8% above said temperature-dependent charging voltage.

18. The process of claim 17 wherein said combined time period of the first charging stage and the second charging stage is between 5 and 8 hours.

19. The process of claim 17 wherein said first charging stage continues for about 3 hours.

20. The process of claim 17 wherein said defined time period of the third charging stage is between 0.5 and 4.0 hours.

21. The process of claim 20 wherein said period is between 0.5 and 1.5 hours.

22. The process of claim 17 wherein said limited current during the third charging stage is between 0.1 and 0.3 times said ten-hour current.

23. The process of claim 17 wherein said maximum voltage during the third charging stage is about 5% above said temperature-dependent charging voltage.

24. The process of claim 17 wherein said temperature-dependent charging voltage of the second charging stage and the third charging stage is continuously controlled according to a voltage/temperature characteristic curve which is contained within a characteristic field of a defined voltage width and controlled by said charging current.

25. The process of claim 1 wherein the second charging state ends in a current which increases at the beginning of the third charging stage.

26. The process of claim 1 wherein the defined time period of said third charging stage ends before the charging voltage reaches said maximum voltage.

27. The process of claim 1 wherein the charging voltage reaches said maximum voltage when the defined time period of said third charging stage begins.

* * * * *